United States Patent [19]
Clark et al.

[11] Patent Number: 4,930,855
[45] Date of Patent: Jun. 5, 1990

[54] WAVELENGTH MULTIPLEXING OF LASERS

[75] Inventors: George L. Clark, Manhattan Beach; Lee O. Heflinger, Torrance, both of Calif.; Chandrasekhar Roychoudhuri, Sandy Hook, Conn.; Robert E. Brooks, Manhattan Beach; Madan M. Sharma, Palos Verdes, both of Calif.

[73] Assignee: TRW Inc., Redondo Beach, Calif.

[21] Appl. No.: 202,356

[22] Filed: Jun. 6, 1988

[51] Int. Cl.$^5$ .............................................. G02B 6/34
[52] U.S. Cl. ............................. 350/96.19; 350/96.15; 350/162.17; 350/162.23
[58] Field of Search ............... 350/96.19, 96.15, 96.16, 350/102.11, 162.2, 162.23, 168, 169, 174, 96.18; 370/1, 3

[56] References Cited

U.S. PATENT DOCUMENTS

| | | | |
|---|---|---|---|
| 3,981,562 | 9/1976 | Anthon | 350/162.12 |
| 4,262,996 | 4/1981 | Yao | 350/96.19 |
| 4,435,041 | 3/1984 | Torok et al. | 350/162.24 |
| 4,652,080 | 3/1987 | Carter et al. | 350/96.19 |
| 4,741,588 | 5/1988 | Nicia et al. | 350/96.18 X |
| 4,819,224 | 4/1989 | Laude | 350/96.18 X |

FOREIGN PATENT DOCUMENTS

| | | | |
|---|---|---|---|
| 0173930 | 3/1986 | European Pat. Off. | 350/96.15 |
| 60-200211 | 10/1985 | Japan | 350/96.16 |
| 62-75406 | 4/1987 | Japan | 350/96.16 |
| 62-264009 | 11/1987 | Japan | 350/96.16 |

Primary Examiner—William L. Sikes
Assistant Examiner—John Ngo
Attorney, Agent, or Firm—Noel F. Heal; Sol L. Goldstein

[57] ABSTRACT

Apparatus for multiplexing or demultiplexing multiple laser beams of different wavelength. In multiplexing, the outputs from multiple diode lasers are combined in such a manner as to produce a practically parallel set of beams for direction onto a diffraction grating. The latter component deflects each beam from its normal path by an angular amount determined from the wavelength of the incident light. The angles of incidence of the multiple beams are chosen to provide angles of diffraction that are practically identical for all wavelengths under consideration. In demultiplexing, similar apparatus includes a diffraction grating to provide angular dispersion of the multiple wavelengths, at least one lens to magnify the angular differences, and a set of detectors positioned in the paths of the dispersed beams of different wavelengths.

16 Claims, 3 Drawing Sheets

WAVELENGTH MULTIPLEXING OF LASERS

BACKGROUND OF THE INVENTION

This invention relates generally to laser communication systems and, more particularly, to techniques for increasing the efficiency of communication by lasers. Semiconductor diode lasers are attractive for communications in space because of their compactness and relatively low power consumption. However, for distances of about 40,000 km or more, an average laser power of at least 300 mW is needed to obtain communication rates in the 1 Gbit/s (gigabit per second) range. Single diode lasers are not yet available at this power level. Even with the use of coherent laser arrays to increase power output, there is still a need for a new approach to increase the bandwidth, versatility and reliability of the communication system. Present technology is limited to communications rates of about 1 Gbit/s. Transmission of multiple communication channels involves the use of electronic multiplexing before the diode laser (or array) is modulated, and this approach has inherent reliability problems. Although it has been recognized that wavelength multiplexing might be employed to address some of these problems, filter technology has limited the number of separate wavelengths that can be mixed. No-one prior to this invention has provided a practical solution to the difficulties that wavelength multiplexing poses.

SUMMARY OF THE INVENTION

The present invention resides in a laser wavelength multiplexing and demultiplexing system to increase the power of a communications beam and provide a practically colinear beam from a plurality of single-mode lasers. In general terms, the apparatus of the invention, as viewed at a transmission end of a communication system, comprises a plurality of single-mode diode lasers operating at different selected wavelengths, and means for combining the outputs of the lasers to produce a nearly diffraction-limited and colinear beam having an average power approximating the sum of the outputs of the individual lasers.

In the illustrative embodiments of the invention, the apparatus also includes a dispersive element that provides a deflection angle dependent on the wavelength of the incident light. Such an element may be a diffraction grating, for example. The means for combining the outputs of the lasers includes means for directing the outputs onto the dispersive element at angles of incidence that correspond to the deflection angles provided by the dispersive effect of the element. Therefore, the dispersive element produces a parallel, colinear beam from the plurality of non-parallel incident beams of different wavelengths.

In one illustrative embodiment of the invention, pairs of laser beams are combined by means of reflective roof prisms. Each prism produces a combined output beam from two input beams. Then the prism output beams can be combined until a single composite beam is obtained. The single output beam impinges on a diffraction grating to effect the desired dispersion along colinear optical axes.

In another embodiment, the laser beams are combined by means of multiple optical fibers grouped together. The multiple outputs are focused onto a diffraction grating and diffracted along coincident paths.

In a third embodiment, the multiple laser beams are arranged to enter a telescope eyepiece lens at a wide range of angles. After passing through the eyepiece lens and a telescope objective lens, the beams are collimated but impinge on the diffraction grating at slightly different angles, which are selected to provide identical diffraction angles and colinear output beams.

It will be appreciated from the foregoing that the present invention provides a convenient solution to the problem of combining laser beams by wavelength multiplexing. Other aspects and advantages of the invention will become apparent from the following more detailed description, taken in conjunction with the accompanying drawings.

DESCRIPTION OF THE PREFERRED EMBODIMENT

Figure 1:
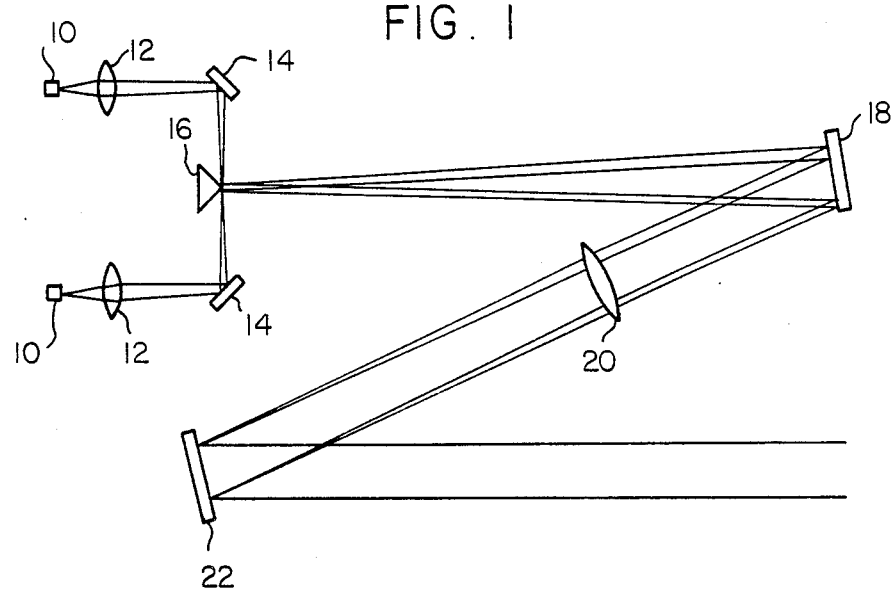
FIG. 1 is a schematic diagram of apparatus for wavelength multiplexing multiple outputs from multiple semiconductor diode lasers.

As shown in the drawings for purposes of illustration, the present invention is principally concerned with a technique for combining multiple laser beams into a single colinear beam of greater power. The principal application of this technique is in space communications by optical beams, using injection diode lasers as a light source. A single diode laser lacks the power needed for long-distance communication in space. Combining multiple lasers to produce a more powerful beam with perfect phase coherency has well known difficulties, but coherent arrays have been produced. Nevertheless, there is still a need to combine diode laser beams for greater total beam power. The use of wavelength multiplexing offers the possibility of combining multiple beams to produce a more powerful beam, and utilizing the separate wavelengths as separate communications channels.

In accordance with the invention, multiple diode lasers operating at different wavelengths are directed onto a dispersive element at appropriate angles to produce a set of output beams that are practically coincident or colinear.

FIG. 1 shows by way of example a pair of diode lasers, indicated by reference numeral 10, having outputs focused by corresponding lenses 12 onto the reflective surfaces of a roof reflector or roof prism 16. by way of turning mirrors 14. The roof prism 16 reflects both beams along a generally identical path, although the two beams are still distinguishable by having slightly different angular directions, determined by the selected orientations of the turning mirrors 14 and the roof prism 16. The beams are reflected by another turning mirror 18, which plays no part in the invention other than rendering the apparatus more compact. The beams pass through a collimating lens 20 and are incident on a diffraction grating 22. The relative angular directions of the two beams were selected with a knowledge of the effect of the diffraction grating 22 on the incident beams. As is well known, a diffraction grating provides an angle of diffraction that is dependent on the wavelength of the incident light. Thus, different wavelengths will be deflected through different angles by the diffraction grating 22, and if the angles of incidence are properly chosen in relation to the wavelengths, the output beams from the diffraction grating will be practically colinear, at least with respect to the plane of the diffraction grating.

The relationship between the angle of incidence $\theta_i$ and the angle of diffraction $\theta_d$ from a diffraction grating is given by (first order of diffraction):

$$\sin \theta_i + \sin \theta_d = \lambda/d,$$

where $\theta_i$ and $\theta_d$ are measured from the normal direction, $\lambda$ is the wavelength and d is the line spacing of the grating. Since the desired mode of operation of the grating is with a common angle of diffraction, a significant quantity is the angular beam spread due to the grating, for a single mode laser. This can be obtained by differentiating and rearranging the above equation, to obtain:

$$d\theta_i = d\lambda/(d \cos \theta_i).$$

For a laser line width of 0.1A, as has been reported, the angular spread due to the effect of the grating on a single laser beam is 2.5 microradians, which is negligible when compared with the effect of normal diffraction on a beam of about three centimeters diameter.

The same equations can be used to determine the appropriate angles of incidence for beams of various wavelengths. In this regard, it will be understood that the angles of incidence are determined not only by the various mirror angles associated with the separate laser beams, but also by the magnification of lenses interposed between the diode lasers and the diffraction grating 22. For example, the relative angular directions of the separated laser beams may be relatively widely spaced near the diode lasers, and then reduced to the appropriate angular separations by the action of one or more lenses prior to reaching the diffraction grating 22.

Figure 2:
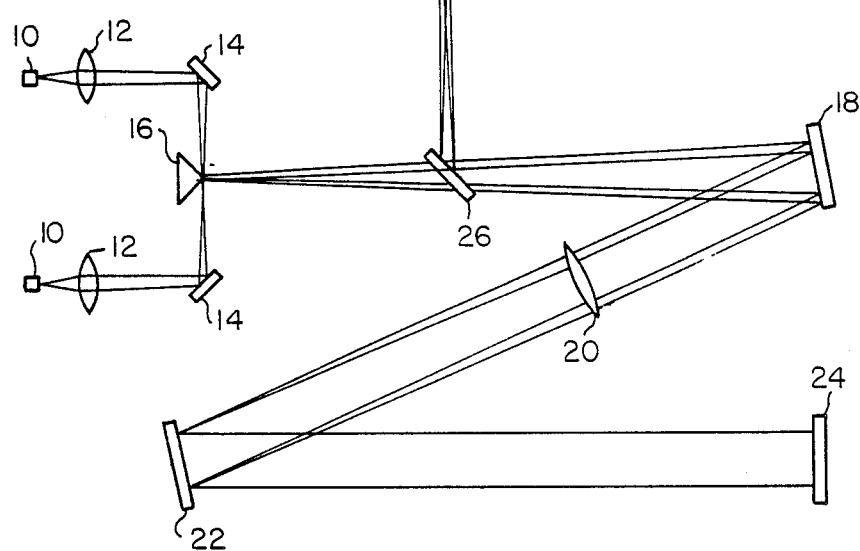
FIG. 2 is a schematic diagram similar to FIG. 1, and also showing additional elements to demonstrate the colinearity and nearly diffraction-limited quality of the output beams from the lasers.

FIG. 2 shows the additional apparatus needed to demonstrate the colinearity and diffraction-limited quality of the output beam from the diffraction grating 22. A retromirror 24 is positioned in the path of the output beam from the grating 22. The output beam is reflected back along its original path, through the diffraction grating 22 and the turning mirror 20, until it reaches a beam-splitting mirror 26 located between the turning mirror 18 and the roof prism 16. The return beam reflected from the beam-splitting mirror is focused onto an image plane 28. Any angular errors in the colinearity of the output beam will be indicated by the position of the beam images on the image plane. In short, the image plane 28 permits analysis of the output beam from the apparatus.

Figure 3:
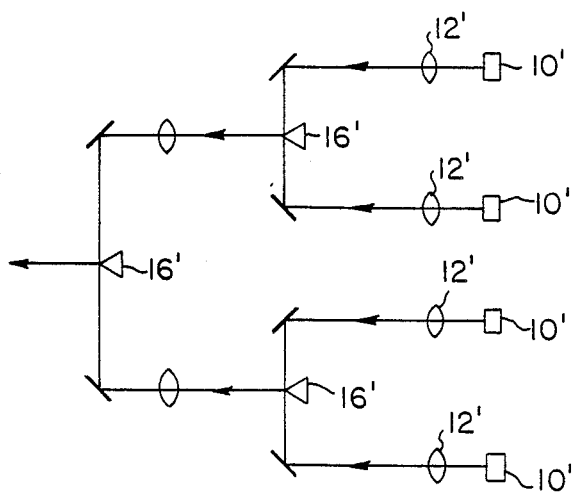
FIG. 3 is a fragmentary schematic view illustrating the application of the same multiplexing principle to more than two diode lasers.
Figure 7:
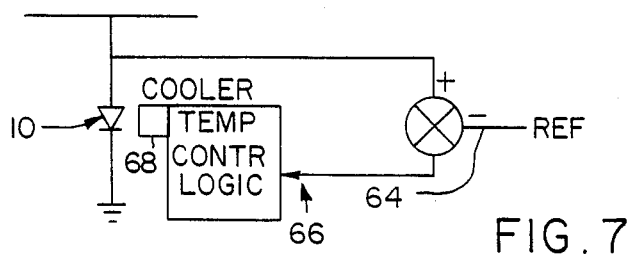
FIG. 7 is a schematic view of a wavelength control system for use in conjunction with the multiplexer of the invention.

As shown in FIG. 3, four diode lasers 10' may be combined using three roof prisms 18', two of which are used to combine two separate pairs of laser outputs, and the third of which is used to combine the outputs of the first two prisms. It will be apparent that the same technique can be extended to combine larger numbers of diode lasers into a single colinear output beam.

Figure 4:
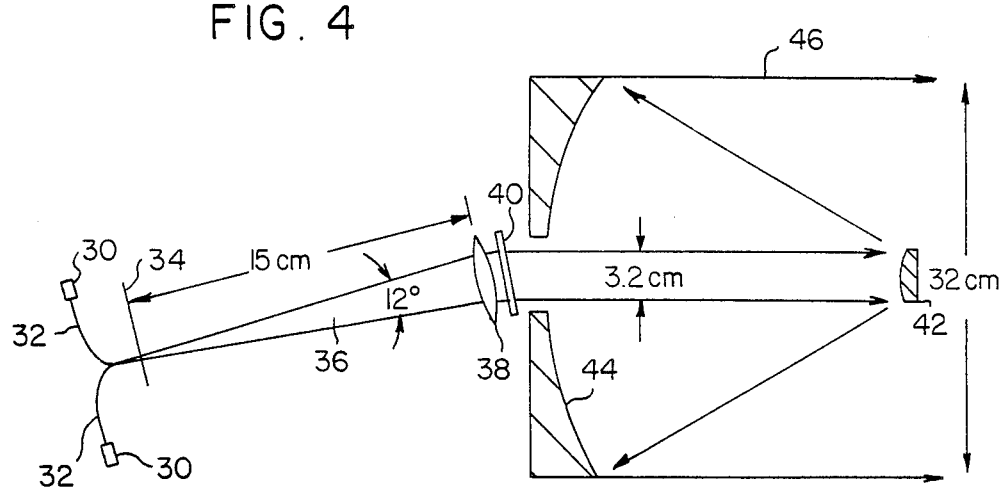
FIG. 4 is a schematic view of an alternative embodiment of the invention.

FIG. 4 shows another embodiment of the invention, in which multiple diode lasers, here indicated at 30, are combined by means of single-mode optical fibers 32, the ends of which terminate in a focal plane 34, and provide a diverging set of beams, indicated at 36. The beams 36 pass through a collimating lens 38, which directs the beams onto a diffraction grating 40. Again, the diffraction grating diffracts each of the beams through an angle dependent on the wavelength, and the angles of incidence are carefully chosen to provide identical angles of diffraction for each of the beams. Therefore, the output beams are colinear. The figure shows the output beams being reflected by a secondary mirror 42 and then a primary mirror 44, to emerge as a single beam 46.

Figure 5:
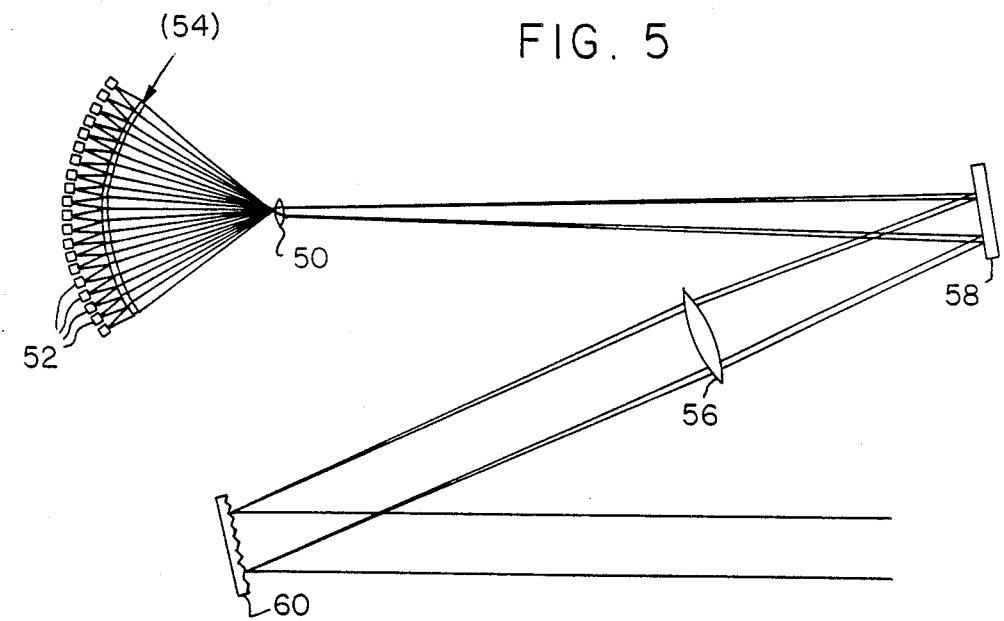
FIG. 5 is a schematic view of another embodiment of a wavelength multiplexer in accordance with the invention.
Figure 6:
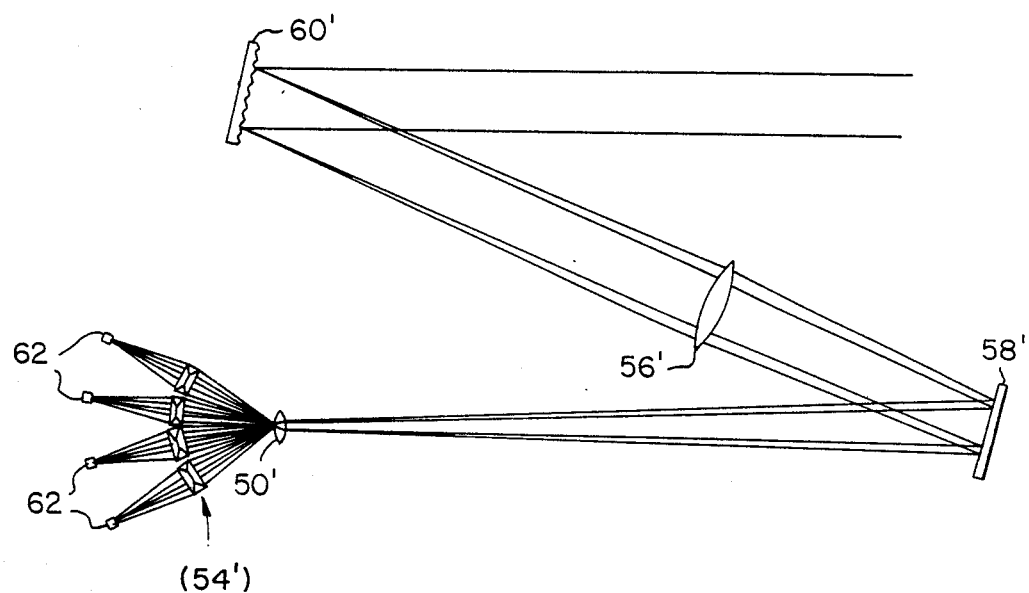
FIG. 6 is a schematic view of a wavelength demultiplexer similar in principle to the multiplexer of FIG. 6.

Another useful embodiment of the invention is shown in FIGS. 5 and 6. Instead of using roof prisms to combine the several laser beams, this embodiment employs a telescope eyepiece 50, into which the beams are directed from a plurality of diode lasers 52, through an equal plurality of focusing lenses 54. The lasers 52 are preferably arranged in a circular arc. The focusing lenses 54 are microscope objectives having sufficient numerical aperture to accommodate the divergence of each laser. A new waist of each beam is formed at the telescope eyepiece 50, and the beams then diverge by diffraction, to fill a telescope objective lens 56. In the illustrative embodiment of the multiplexer, a turning mirror 58 is positioned between the telescope eyepiece 50 and the objective lens 56.

When the beams emerge from the telescope objective lens 56, they are collimated, but each beam emerges at a slightly different angle determined by its entrance angle to the eyepiece 50. The angles and component spacings are selected such that, when the beams reach the next component, a diffraction grating 60, they are exactly superimposed. The various wavelengths are diffracted by the grating 60 into a colinear beam because of the relationships between the angles of incidence, the groove spacing of the grating, and the wavelength values.

The eyepiece lens 50 must have a very wide field of view, giving close to diffraction-limited performance at angles up to approximately 41 degrees from the optical axis. This angular spacing is demagnified by the telescope eyepiece and objective lenses, and the resulting angular differences are selected to produce the colinear beams after diffraction by the grating 60.

The grating 60 can be designed to provide a diffraction efficiency of about 80 percent for all of the beams. This is the principal factor limiting the combining efficiency of the multiplexer of the invention.

The same principle can be employed for demultiplexing a set of colinear or coincident beams of different wavelengths, as illustrated in FIG. 6. The colinear beams are first incident on a diffraction grating 60', from which they are diffracted at slightly different angles, depending on their wavelengths. The slightly diverging beams pass through a telescope objective lens 56', are reflected from a turning mirror 58', and then pass through a telescope eyepiece lens 50'. Multiple outputs from the eyepiece 50', one for each wavelength, diverge into multiple focusing lenses 54', one for each communications channel, and are focused into corresponding optical detectors 62.

It will be understood that the turning mirrors 58, 58' are not essential to the invention, but are used to produce a more compact structure.

A well known difficulty in the operation of diode lasers is that the temperature, and hence the wavelength, of a semiconductor diode may vary during its operation. The temperature of a diode junction is related to its junction voltage and current, and this characteristic may be employed to control the temperature, and hence the wavelength. One approach used in the apparatus of the invention is to periodically reduce the diode current to a well regulated level for a brief interval, such as three microseconds. The junction voltage is sampled during this time and compared to a reference voltage, as indicated at 64. The difference between the sampled voltage and the reference is used as an error signal, as indicated at 66, to adjust the current through a thermoelectric cooler 68 controlling the temperature of the diode laser. Such a control loop can maintain the wavelength output to within 0.0015% over a long period of time.

It will be appreciated from the foregoing that the present invention represents a significant advance in the field of laser communication systems. In particular, the invention permits the convenient wavelength multiplexing of multiple diode lasers, to produce a practically colinear and diffraction-limited output beam. A similar structure can serve as a demultiplexing apparatus at the receiving end of a communications system.

It will also be appreciated that, although several embodiments of the invention have been described in detail for purposes of illustration, various modifications may be made without departing from the spirit and scope of the invention. For example, the term optical-wavelength employed in the claims is not intended to be limited to the visible light spectrum. Accordingly, the invention is not to be limited by the illustrative embodiments described in the specification.

We claim:

1. In an optical-wavelength communication system, apparatus comprising:
    a plurality of diode lasers operating at different wavelengths; and
    means for combining substantially the entire outputs of the lasers in such a manner as to produce a substantially colinear and nearly diffraction-limited output beam having an average power approximating the sum of the outputs of the separate lasers;
    wherein the means for combining includes
       dispersion means, and
       means for collimating and directing the outputs of the lasers onto the dispersion means at appropriate angles of incidence to produce colinear dispersed beams.

2. Apparatus as defined in claim 1, wherein the means for combining the outputs further includes:
    at least one roof prism; and
    means for directing a pair of beams from separate lasers toward the roof prism from generally opposing directions, to be reflected along practically coincident paths.

3. Apparatus as defined in claim 2, wherein the means for combining the outputs further includes:
    additional roof prisms for combining additional pairs of laser beams.

4. Apparatus as defined in claim 2, wherein the dispersion means includes a diffraction grating.

5. Apparatus as defined in claim 1, and further comprising:
    means for controlling the temperature of each of the lasers to conform to a reference level, and to stabilize the wavelength of its output.

6. Apparatus as defined in claim 1, wherein the means for combining the outputs further includes:
    a plurality of optical fibers coupled to the diode lasers and having output ends grouped together to provide a plurality of light paths along slightly divergent but practically coincident paths.

7. Apparatus as defined in claim 6, wherein the dispersion means includes a diffraction grating.

8. A method for multiplexing multiple output beams from a plurality of diode lasers, the method comprising the steps of:
    generating a plurality of laser beams at different selected wavelengths;
    combining the plurality of laser beams in such a manner as to form a set of beams that are nearly coincident but are propagating at slightly different angles, depending on their wavelength;
    directing the set of beams onto a diffraction grating; and
    diffracting the various wavelength beams through different angles, to produce diffracted output beams that are practically colinear and form a single output beam that is nearly diffraction-limited and has an average power approximating the sum of the outputs of the separate lasers.

9. A method for multiplexing multiple output beams from a plurality of diode lasers, the method comprising the steps of:
    directing each pair of the laser beams onto a roof prism from generally opposite directions, to produce a single set of practically colinear beams;
    combining the sets of practically colinear beams with other similar sets, using additional roof prisms, to produce a single composite beam;
    focusing the single composite beam onto a diffraction grating; and
    diffracting the various wavelength beams through different angles, to produce diffracted output beams that are practically colinear.

10. In an optical-wavelength communication system, apparatus comprising:
    a plurality of diode lasers operating at different wavelengths;
    a telescope eyepiece lens;
    a telescope objective lens;
    means for directing output beams from the lasers into the telescope eyepiece lens at varying incidence angles determined from the wavelengths of the lasers, wherein the eyepiece lens produces practically coincident output beams directed toward the objective lens; and
    a diffraction grating positioned in the path of the output beams emerging from the objective lens, which beams are at slightly different angles depending on their wavelengths, and wherein the diffraction grating produces diffracted beams that are colinear, nearly diffraction-limited, and have an average power approximating the sum of the outputs of the separate lasers.

11. Apparatus as defined in claim 10, wherein:

the lasers are arrayed along a circular arc about the telescope eyepiece lens; and the means for directing output beams from the lasers into the telescope eyepiece lens includes a plurality of lenses arrayed in a concentric circular arc closer to the telescope eyepiece lens.

12. Apparatus as defined in claim 10, and further comprising:

a turning mirror positioned in the paths of the combined beams, to shorten the overall physical length of the apparatus.

13. Apparatus as defined in claim 12, wherein:

the turning mirror is located between the telescope eyepiece and objective lenses.

14. In an optical-wavelength communication system, demultiplexing apparatus comprising:

a diffraction grating positioned in the path of a set of colinear beams of different wavelengths, to produce a slightly divergent set of diffracted beams;

a telescope objective lens positioned in the path of the diverging beams from the diffraction grating;

a telescope eyepiece lens positioned in the path of the beams from the telescope objective lens, to magnify the divergence of the beams of different wavelength, and produce separate beams for different wavelengths;

a plurality of optical detectors, each positioned in the path of a group of one or more of the separate beams, to generate electrical signals in response to different communication channels employing the different groups of beams.

15. A method for wavelength multiplexing a plurality of laser beams of different wavelengths, the method comprising the steps of:

focusing a plurality of laser beams from different angles into a telescope eyepiece lens;

demagnifying the angular differences separating the laser beams, in the eyepiece lens and a telescope objective lens;

directing the demagnified laser beams onto a diffraction grating at preselected angles of incidence; and diffracting the beams from the diffraction grating at practically equal angles of diffraction, wherein the angles of incidence onto the diffraction grating are controlled by the angular and spatial relationships of the apparatus to produce a desired colinear relationship among the diffracted beams.

16. A method of demultiplexing a set of colinear beams of different wavelengths, the method comprising the steps of:

diffracting the set of colinear beams to produce diffracted beams in slightly different directions depending on their wavelength;

magnifying the angular differences between the separate beams in a telescope objective lens and a telescope eyepiece lens, to produce a set of beams of different wavelengths in directions radiating out from the eyepiece lens; and detecting the light intensity of groups of one or more of the beams emanating from the eyepiece lens and corresponding to separate communication channels.

* * * * *